(12) United States Patent
Case et al.

(10) Patent No.: US 6,907,119 B2
(45) Date of Patent: Jun. 14, 2005

(54) AUTOMATED BUSINESS DIRECTORY ASSISTANCE

(75) Inventors: Eliot M. Case, Denver, CO (US); Carl W. Pacheco, Denver, CO (US)

(73) Assignee: Qwest Communications International, Inc., Denver, CO (US)

( * ) Notice: Subject to any disclaimer, the term of this patent is extended or adjusted under 35 U.S.C. 154(b) by 649 days.

(21) Appl. No.: 09/802,068

(22) Filed: Mar. 8, 2001

(65) Prior Publication Data

US 2002/0126819 A1 Sep. 12, 2002

(51) Int. Cl.[7] .......................... H04M 3/42; H04M 1/64; H04M 3/00; H04M 5/00
(52) U.S. Cl. ............................ 379/218.01; 379/88.04; 379/265.02
(58) Field of Search .......................... 379/218.01, 88.04, 379/265.02; 704/275; 707/10

(56) References Cited

U.S. PATENT DOCUMENTS

| 5,479,488 | A | * | 12/1995 | Lennig et al. | ........... 379/88.04 |
| 6,243,684 | B1 | * | 6/2001 | Stuart et al. | ................ 704/275 |
| 6,404,876 | B1 | * | 6/2002 | Smith et al. | ........... 379/218.01 |
| 6,421,672 | B1 | * | 7/2002 | McAllister et al. | ........... 707/10 |

* cited by examiner

Primary Examiner—Ahmad F. Matar
Assistant Examiner—Thjuan P Knowlin
(74) Attorney, Agent, or Firm—Brooks Kushman P.C.

(57) ABSTRACT

Automated business directory assistance routes a call for directory assistance to a speech recognizer which determines the type of assistance requested. If the request is for business information, the requested information is automatically retrieved. Otherwise, the call is routed to a call center.

17 Claims, 3 Drawing Sheets

US 6,907,119 B2

AUTOMATED BUSINESS DIRECTORY ASSISTANCE

BACKGROUND OF THE INVENTION

1. Field of the Invention

The present invention relates to providing automated directory assistance to users of a telecommunications system.

2. Background Art

Telecommunications systems rely on a sending telecommunications unit, or caller, knowing the address or telephone number of the destination telecommunication unit. One traditional method of finding a destination telephone number uses hard copy telephone directories. So-called "white pages" list telephone numbers by name and "yellow pages" list telephone numbers by business category. Telephone directories are bulky and expensive to print and distribute. Further, most people do not have directories for areas outside of their local region. A second traditional method for obtaining a telephone number is by calling a directory assistance operator. A human operator at a call center responds to a request for information by looking up the desired phone number based on one or more of personal name, business name, and location. Due to the interaction and time required, call centers typically do not handle requests for phone numbers by business category. Also, phone centers are expensive to maintain.

Recently, attempts have been made to use voice recognition systems to provide directory assistance. Typically, hardware and software are utilized to recognize names and numbers spoken by a requesting caller. Several problems have prevented such systems from gaining wide acceptance. For example, automated voice recognition systems typically have difficulty recognizing personal names. Thus, a caller requesting assistance must often spell the name, which requires that the spelling be known. Also, accents and variations in speech pattern occasionally make requests for information difficult to process by current speech recognition technology.

What is needed is automated directory assistance that overcomes problems with current systems. Automated directory assistance should correctly handle a wide variety of situations without dropping the requesting call. Such an automated directory system should easily integrate with existing telecommunications equipment.

SUMMARY OF THE INVENTION

Automated business directory assistance routes a call for directory assistance to a speech recognizer which determines the type of assistance requested. If the request is for business information, the requested business directory assistance information is automatically retrieved. Otherwise, the call is routed to a call center.

A method for directory assistance in response to a directory assistance call is provided. A call is received and a determination made as to whether or not the call is a request for directory assistance. If not, the call is routed as dialed. If the call is a request for directory assistance, the call is routed to a speech recognizer. The type of directory assistance requested is determined. If the caller is not requesting business directory assistance, the call is routed to a call center. If the caller is requesting business directory assistance, at least one telephone number satisfying the caller request is automatically determined.

The caller may request business information by business name or by business category. Determining the telephone number may be based on the location of the caller. Once one or more numbers are found, the caller may be queried for automatic connection and, if the caller requests automatic connection, the call is routed to a selected connection number.

If the caller is having problems automatically obtaining business directory assistance, the call may be routed to a call center. The call center may be supplied with information about caller activity.

A system for directory assistance is also provided. The system includes at least one switch for routing incoming calls. The switch determines if an incoming call is a request for directory assistance. A database holds business directory information. A speech recognizer determines if the request for directory assistance is for business information and, if so, accesses the database to satisfy the request. Otherwise, the call is routed to a call center.

A speech recognizer for use in servicing a call requesting directory assistance is also provided. The speech recognizer provides at least one number in response to a request for business directory assistance and routes the call to a call center otherwise.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
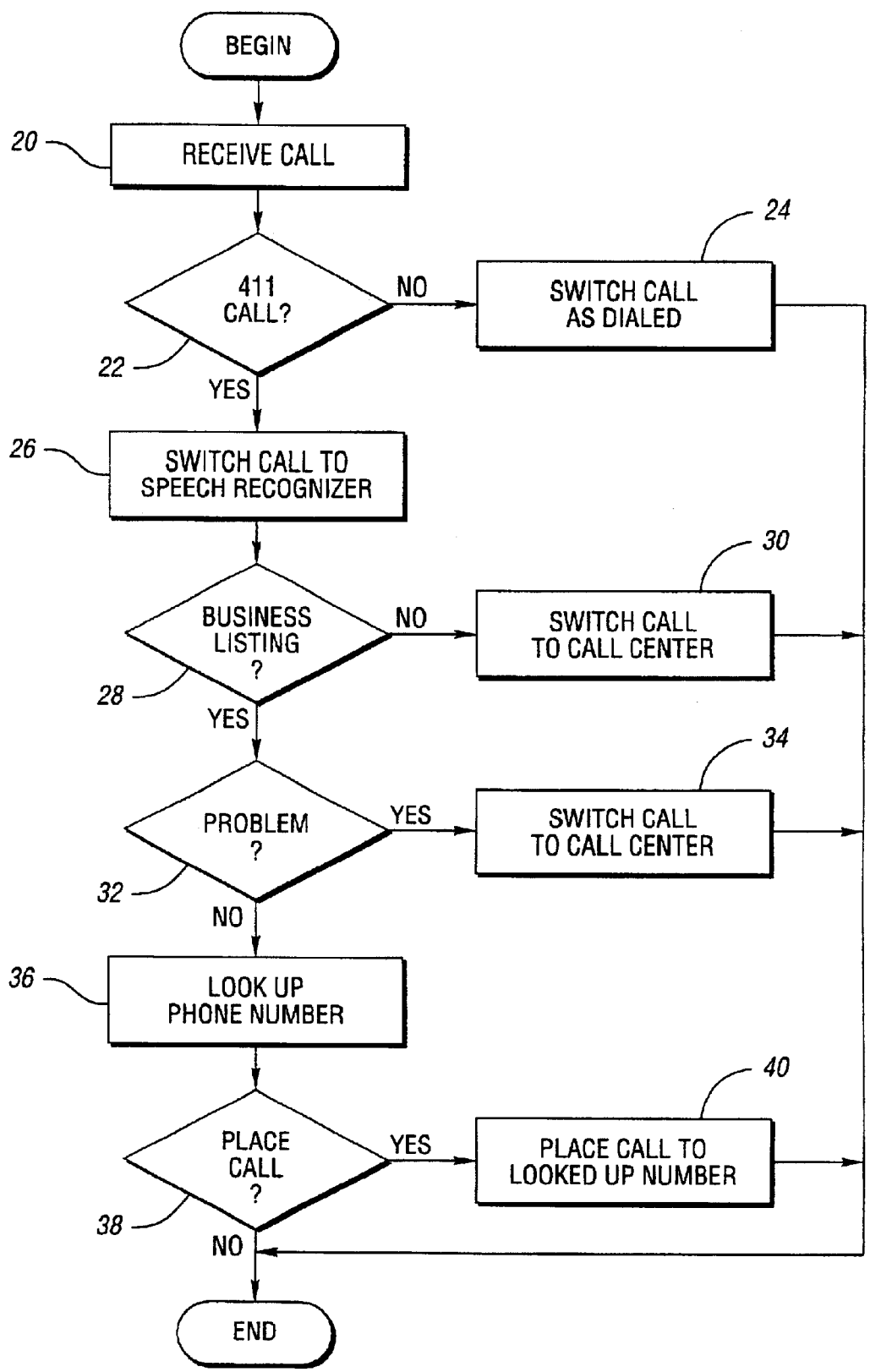
FIG. 1 is a flow diagram illustrating directory assistance according to an embodiment of the present invention.

Referring to FIG. 1, a flow diagram illustrating automatic business directory assistance according to an embodiment of the present invention is shown. As will be appreciated by one of ordinary skill in the art, the operations illustrated in the flow diagram are not necessarily sequential operations. The order of steps may be modified within the spirit and scope of the present invention and the order shown here is for logical presentation. Also, the method illustrated in FIG. 1 may be implemented by any combination of hardware, software, firmware, and the like at one location or distributed. The present invention transcends any particular implementation and the embodiment is shown in sequential flow chart form for ease of illustration.

A call is received in block 20. A check is made to determine if the call is a request for a directory assistance in block 22. Preferably, this determination is made based on a dialing pattern entered by the caller such as, for example, the numeric pattern "411." The determination may also be based on signaling information. If the received call is not for directory assistance, the call is switched as dialed in block 24. If the call is a request for directory assistance, the call is routed to a speech recognizer in block 26.

A check is made to determine the type of directory assistance requested in block 28. This is preferably done by querying the caller. If the requested information is not for a business listing, the call is switched to a call center in block 30. The call center has operators which respond to non-business information such as requests for individual or personal phone numbers, government listings, and the like.

If the incoming call is a request for business information, checks for problems with the call are made in block 32. Problems may be determined in a variety of manners. For example, if the speech recognizer cannot resolve the voice patterns of the caller or if the caller fails to respond within a set period of time, the call is switched to a call center in block 34. The caller may also elect to speak with a human operator either by vocalizing a selection or by pushing one or more keys on the sending telecommunications unit. The call center used to handle problem requests for business information and the call center used to handle requests for non-business information may be same call center or may be different call centers. Further, either call center may be distributed.

If no problems are encountered, one or more phone numbers are automatically looked up in block 36. The requesting caller may select a business name mode in which the caller supplies a business name and is supplied with one or more phone numbers corresponding to the business name. This is similar to using business "white pages." The caller may also select a category name in which the caller vocalizes or selects from a list of options a business category. This is similar to using "yellow pages." The caller then receives one or more phone numbers corresponding to businesses listed by that category.

The user may be prompted for a subcategory name or geographic location to restrict the number of numbers returned. Also, the location of the caller may be automatically determined and this location used to restrict the number of numbers returned. Caller location may be determined by a variety of means, including caller ID, calling number area code and exchange code, wireless phone encoded location, and the like. The caller may also enter location information, either of the caller or desired business, through key entries or spoken commands.

Additional information may be returned together with or instead of the phone number, either automatically or based on caller selected options. Such business directory assistance information may include business location, business name, business description, business operating hours, advertising information, and the like.

The user may be queried for automatic call connection as in block 38. If the user wishes to be automatically connected and more than one number has been provided, the user first selects a number to try. The call is then routed to the selected connection number in block 40.

Figure 2:
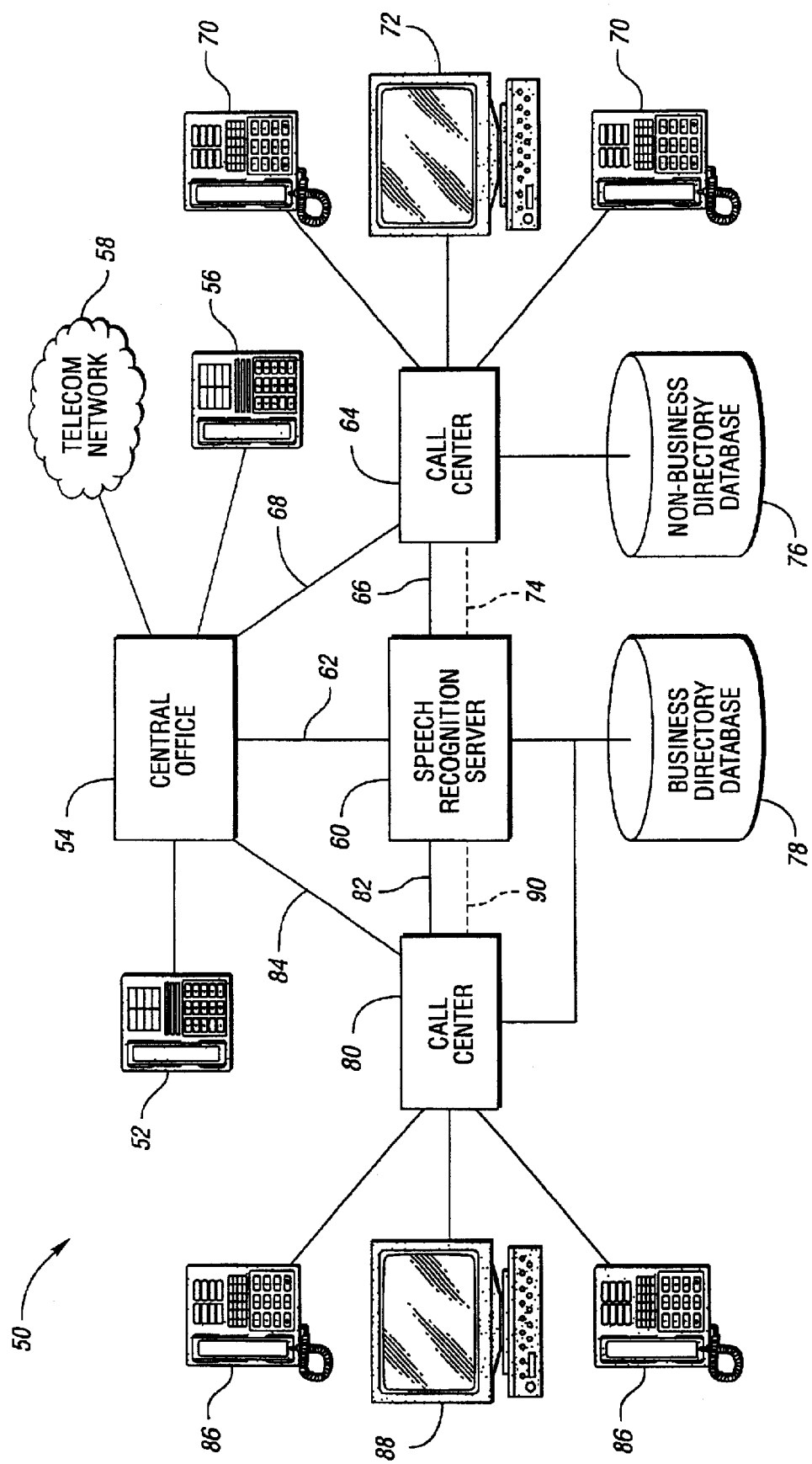
FIG. 2 is a block diagram of a directory assistance system according to an embodiment of the present invention.

Referring now to FIG. 2, a block diagram of a directory assistance system according to an embodiment of the present invention is shown. The directory assistance system is shown generally by 50. A caller, illustrated by telephone 52, places a call which is received by central office 54. Caller 54 may be any business or non-business source. Central office 54 determines if the call is a request for directory assistance. This determination is typically based on a dialing pattern entered by caller 52, such as the numeric pattern "411." If the call is not a request for directory assistance, central office 54 routes the call as dialed by connecting caller 52 to local destination 56 or to a long distance destination through telecommunications network 58. Central office 54 is preferably implemented to function as an ESS 5 switch.

If caller 52 has placed a call requesting directory assistance, central office 54 routes the call to speech recognition server 60 connected to central office 54 through voice link 62. Speed recognition server 60 recognizes and interprets spoken language received from caller 52. Speech recognition server 60 may be implemented as a server running the WINDOWS 2000 operating system from Microsoft Corp. or other suitable operating systems such as Unix, Linux, and the like. Speech recognition server 60 may include special hardware, as is known in the art, for assisting in recognizing speech patterns. Speech recognition server 60 may also execute one or more programs specifically designed to implement the present invention. These programs may be written in a standard programming language such as, for example, C or C++. These programs may also be written in high level coding or application building languages specifically designed for speech recognition applications such as SPEECHMANIA and SPEECHPEARL, both available from Philips Speech Processing, a business unit of Royal Philips Electronics.

Speech recognition server 60 queries caller 52 to determine the type of directory assistance requested. Directory assistance requests are divided into one of two types, business and non-business. Business information requests include requests for the telephone number of a particular named business and the name, address, phone number, or other information of one or more businesses within a business category. Business categories may correspond to the categories typically found in a telephone book yellow pages. Subcategories may be introduced to further refine the search and assist caller 52. Business information requests are expected to comprise about two-thirds of all directory assistance requests. Non-business information requests include requests for the personal telephone number of a named individual, the telephone number of a named government agency, and the like. Non-business directory requests tend to be more difficult to correctly recognize and interpret by speech recognition server 60.

If speech recognition server 60 determines that the request from caller 52 is for non-business information, the call from caller 52 is routed to call center 64. The call may be routed through ports in speech recognition server 60 and voice link 66 to call center 64. Preferably, central office 54 bridges the call from caller 52 to call center 64 through voice link 68 thereby not tying up ports in speech recognition server 60. Alternatively, speech recognition server 60 could be directly associated with one or more switches for bridging calls between voice link 62 and voice link 66.

Call center 64 includes a plurality of operators using telephonic transceivers 70 for servicing information requests by caller 52. Call center 64 may also include a plurality of monitors 72 accessed by call operators. Monitor 72 may display information about caller 52 including the name and location of caller 52. Monitor 72 may also display information about the activity of caller 52 within directory assistance system 50. This information may be forwarded to call center 64 from speech recognition server 60 over data link 74.

Non-business directory database 76, accessible by call center 64, contains directory assistance information satisfying non-business directory assistance requests. Non-business directory database 76 is accessed by operators in call center 64 in response to one or more requests placed by caller 52.

If speech recognition server 60 determines caller 52 is requesting business directory assistance, speech recognition server 60 queries caller 52 for the type of access request. Access request types include searching by business name, searching by business category, and the like. Speech recognition server 60 then queries caller 52 for specific business information, such as business name, business category, and the like. Speech recognition server 60 accesses business directory database 78 to satisfy the request placed by caller 52. If a large amount of information in business directory database 78 satisfies the request placed by caller 52, speech recognition server 60 may further query caller 52 to limit the response. Speech recognition server 60 may also limit the information returned to caller 52 based on the location of caller 52. This location may be obtained through caller ID as is commonly known in the art. Once one or more telephone numbers satisfying the request for business information have been found by speech recognition server 60, speech recognition server 60 may query caller 52 to offer the option of connecting caller 52 directly to one of the numbers found. If caller 52 selects or requests such a connection, speech recognition server 60 signals central office 54 to bridge caller 52 to the desired number.

Speech recognition server 60 routes caller 52 to call center 80 if caller 52 is experiencing a problem. Such problems may arise due to a variety of conditions. Caller 52 may be speaking in a language speech recognition server 60 is not programmed to interpret. Caller 52 may also have a heavy accent, making interpretation difficult for speech recognition server 60. At one or more points in servicing the request by caller 52, speech recognition server 60 may present the option to switch to a live operator. Further, a combination of one or more key depressions may be used by caller 52 to indicate a desire to speak with a live operator. Speech recognition server 60 may route caller 52 to call center 80 in a variety of ways, including through ports within speech recognition server 60 and voice link 82 connected to call center 80, by having central office 54 bridge the call to voice link 84 between central office 54 and call center 80, by bridging the call between voice link 62 and voice link 82 at speech recognition server 60, and the like.

Operators in call center 80 respond to the request from caller 52 through telephonic transceivers 86 by accessing business directory database 78. Operators also access monitors 88 in call center 80 to obtain information about caller 52 such as caller name, location, and the like. Monitor 88 may also display information about the activity of caller 52 while using directory assistance system 50. This information is forwarded from speech recognition server 60 to call center 80 over data link 90.

As will be recognized by one of ordinary skill in the art, various embodiments and configurations are possible within the spirit and scope of the present invention. Databases 76, 78 may be implemented separately or as a single database and may be at one location or distributed. Data may further be replicated and kept at multiple locations. Call centers 64, 80 may be the same or separate. Further, either or both may be a single or multiple call centers. Speech recognition server 60 may be implemented at a separate location or may be combined with one or more of central office 54, call center 64 and call center 80. One or more of speech recognition server 60, call center 64, non-business directory database 76, business directory database 78 and call center 80 may be implemented as part of or may be accessed through telecommunications network 58.

Figure 3:
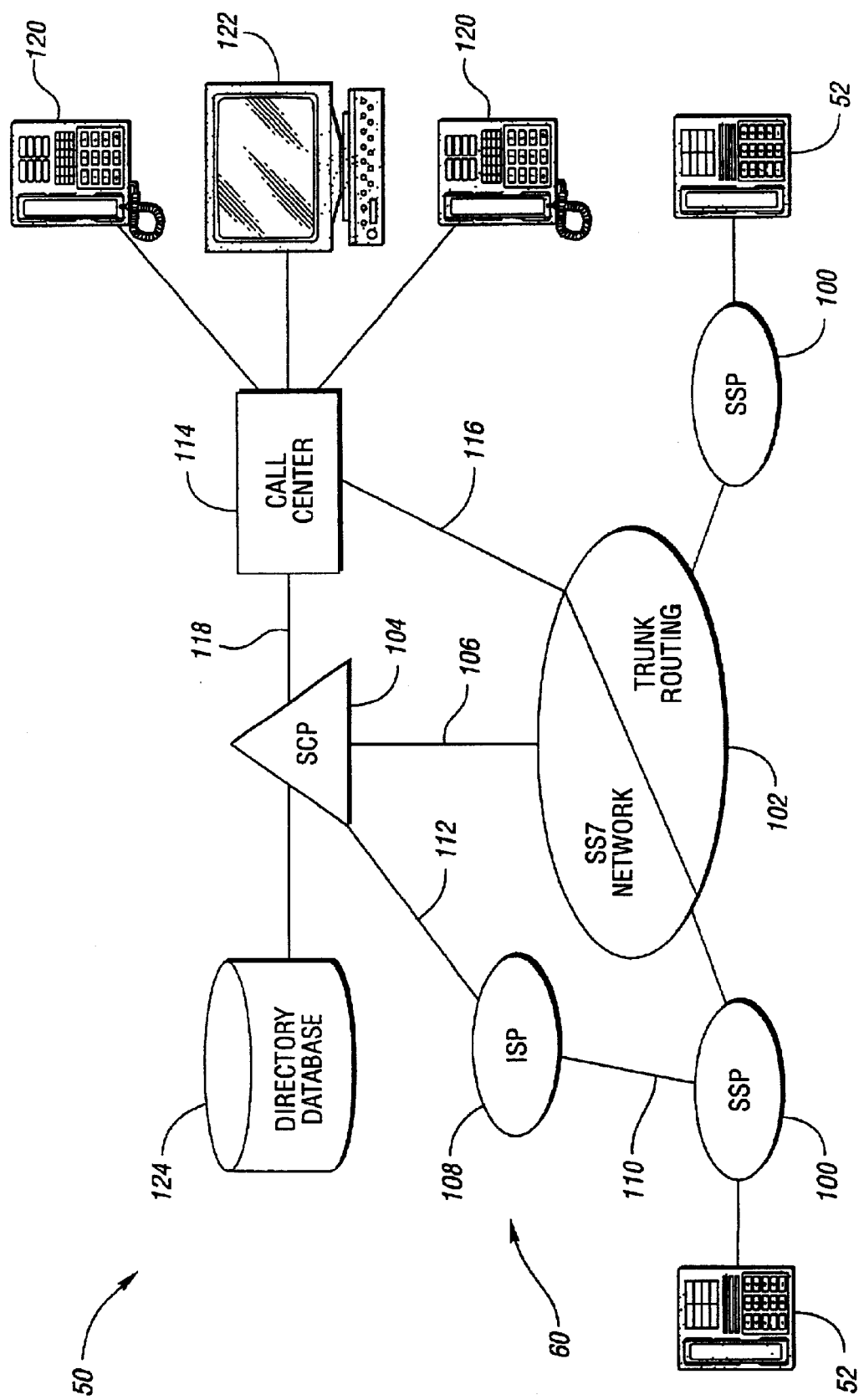
FIG. 3 is a block diagram of a directory assistance system implemented in an AIN system according to an embodiment of the present invention.

Referring now to FIG. 3, a block diagram of a directory assistance system implemented in an AIN system according to an embodiment of the present invention is shown. Directory assistance system 50 may include or may be incorporated within an advanced intelligent network (AIN) implemented using out-of-band signaling, such as through a Signaling System 7 (SS7) system. Caller 52 is connected to service switching point (SSP) 100. Calls are routed between SSPs 100 along voice-data trunks in telecommunications network 102. SSPs 100 perform out-of-band signaling through an interconnected system of signal transfer points in the SS7 components of network 102. Signal transfer points are connected to intelligent service control points (SCPs), one of which is shown by 104, through A-links 106 in the SS7 network. SCP 104 responds to queries for information related to the disposition of a call or a service.

Intelligent service peripheral (ISP) 108 is connected to SSP 100 through primary rate interface (PRI) 110. ISP 108 is connected to SCP 104 through a data link such as TCP/IP network connection 112. ISP 108 supports services to caller 52 such as, for example, voice recognition, digit collection, and the like. Services provided by ISP 108 are described by programs broken into small tasks such as collect digit, play message, get data, interpret spoken statement, route call, and the like. ISP 108 includes at least one processor for executing ISP programs.

Call center 114 is connected to network 102 through trunk 116. Call center 114 also accesses SCP 104 through data link 118. Operators in call center 114 respond to calls through telephonic transceivers 120. Operators may also use monitors 122 to obtain information about caller 52.

When caller 52 places a call, SSP 100 determines if the call is a request for directory assistance. If not, SSP 100 routes the call to a local destination or to network 102. Requests for directory assistance are routed to ISP 108. ISP 108 first queries caller 52 as to whether the request is for business information or non-business information. If caller 52 requests non-business information, the call is routed by SSP 100 through network 102 to call center 114. Operators within call center 114 may then assist caller 52 by accessing directory database 124 through SCP 104.

If caller 52 requests business information, ISP 108 queries caller 52 for additional information such as, for example, whether caller 52 wishes to search by business name or business category. ISP 108 automatically requests data from SCP 104. SCP 104 accesses directory database 124, then forwards the requested information to ISP 108. In this configuration, ISP 108 and SCP 104 function as speech recognition server 60. ISP 108 may present the information to caller 52 as well as provide additional options such as those to narrow the information search. In one embodiment, SCP 104 determines at least one telephone number satisfying the request from caller 52 based on the location of caller 52.

If ISP 108 determines that caller 52 is experiencing problems with the automated portion of directory assistance system 50, ISP 108 directs SSP 100 to switch caller 52 through network 102 to call center 114. An operator within call center 114 then assists caller 52. ISP 108 forwards to call center 114 information about the activity of caller 52. Call center 114 displays this information on monitor 122, providing the operator with additional information to assist caller 52.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for directory assistance in response to a call from a caller, the method comprising:

receiving the call;

determining if the call is a request for directory assistance and, if not, routing the call as dialed through a call routing telecommunications network;

if the call is a request for directory assistance, routing the call through an intelligent service peripheral to a speech recognizer, the intelligent service peripheral being separate from the call routing telecommunications network;

in the intelligent service peripheral, determining the type of directory assistance requested;

if the caller is not requesting business directory assistance, routing the call through the telecommunications network to a call center;

if the caller is requesting business directory assistance, automatically determining at least one telephone number satisfying the caller request without communication through the call routing telecommunications network by searching a directory database associated with the intelligent service peripheral, thereby limiting use of the call routing telecommunications network.

2. A method for directory assistance as in claim 1 wherein the caller requests business information by business name.

3. A method for directory assistance as in claim 1 wherein the caller requests business information by business category.

4. A method for directory assistance as in claim 1 wherein determining at least one telephone number is based on the location of the caller.

5. A method for directory assistance as in claim 1 further comprising:

querying the caller for automatic connection; and if the caller requests automatic connection, routing the call to a selected connection number.

6. A method for directory assistance as in claim 1 further comprising:

determining that the caller is having problems automatically obtaining business directory assistance; and routing the call to a call center.

7. A method for directory assistance as in claim 6 further comprising supplying the call center with information about caller activity.

8. A method for directory assistance as in claim 1 wherein determining if the call is a request for directory assistance is based on a dialing pattern entered by the caller.

9. A method for providing directory assistance without using a call routing network for business directory assistance, wherein a call for directory assistance is routed through an intelligent service peripheral to a speech recognizer to determine the type of assistance requested, wherein the speech recognizer is separate from the call routing network, and, if the request is for business information, automatically retrieving requested business directory assistance information by searching in a directory database associated with the intelligent service peripheral without communication through the call routing network, and if the call is not for business directory assistance, routing the call through the routing network to a call center.

10. A system for directory assistance comprising:

at least one switch for routing incoming calls, to either an intelligent service peripheral or a call routing network, the switch determining if an incoming call is a request for directory assistarce, routing requests for directory assistance to the intelligent service peripheral and routing non-requests for directory assistace to the call routing network, thereby limiting use of the call routing telecommunications network;

a database holding business directory information;

at least one call center; and a speech recognizer associated with the intelligent sevice peripheral and in communication with the at least one switch, the database and the at least one call center, the speech recognizer determining if the request for directory assistance is for business information and, if so, accessing the database to satisfy the request, otherwise routing the call to the call center.

11. A system for directory assistance as in claim 10 wherein the speech recognizer satisfies the request based on receiving a business name.

12. A system for directory assistance as in claim 10 wherein the speech recognizer satisfies the request based on receiving a business category.

13. A system for directory assistance as in claim 10 wherein the speech recognizer satisfies the request based on location of a caller placing the request.

14. A system for directory assistance as in claim 10 wherein the speech recognizer queries a caller placing the request to connect to a number satisfying the request.

15. A system for directory assistance as in claim 10 wherein the speech recognizer routes a caller placing the request to a call center if the caller is experiencing a problem.

16. A system for directory assistance as in claim 15 wherein the speech recognizer sends information about caller activity to the call center.

17. A system for directory assistance as in claim 10 wherein determining if an incoming call is a request for directory assistance is based on a dialing pattern entered by a caller.

* * * * *